UNITED STATES PATENT OFFICE.

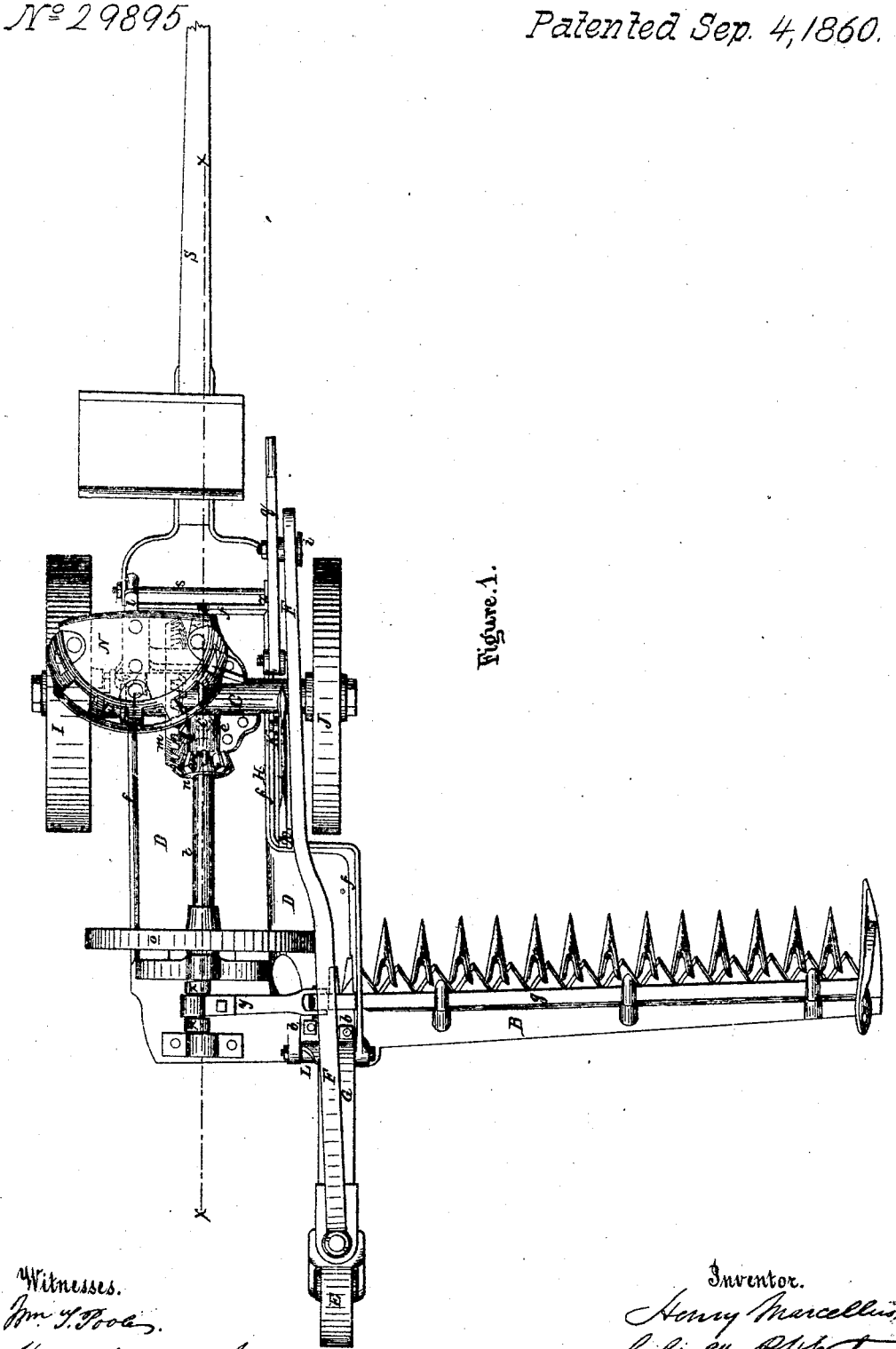

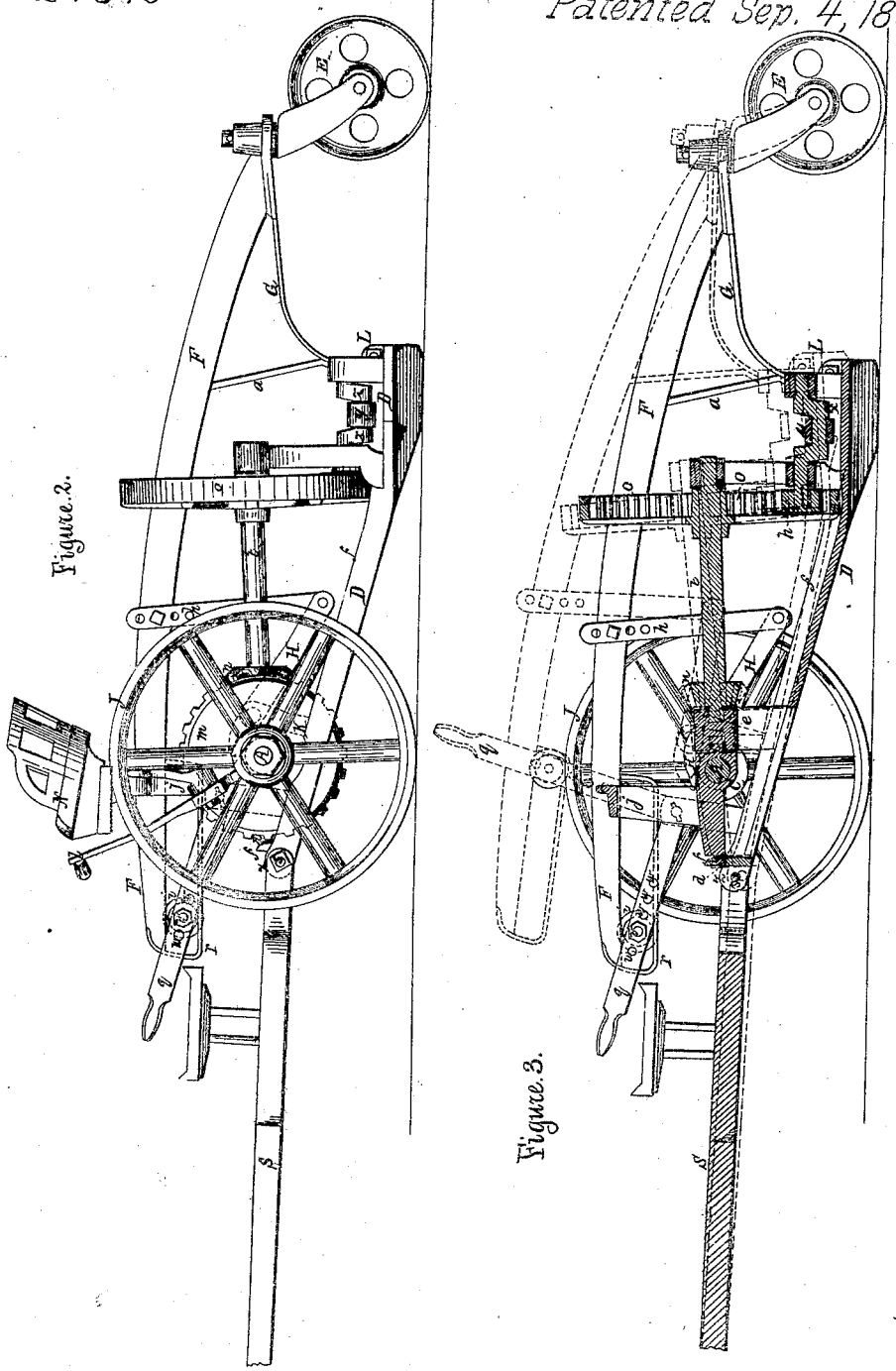

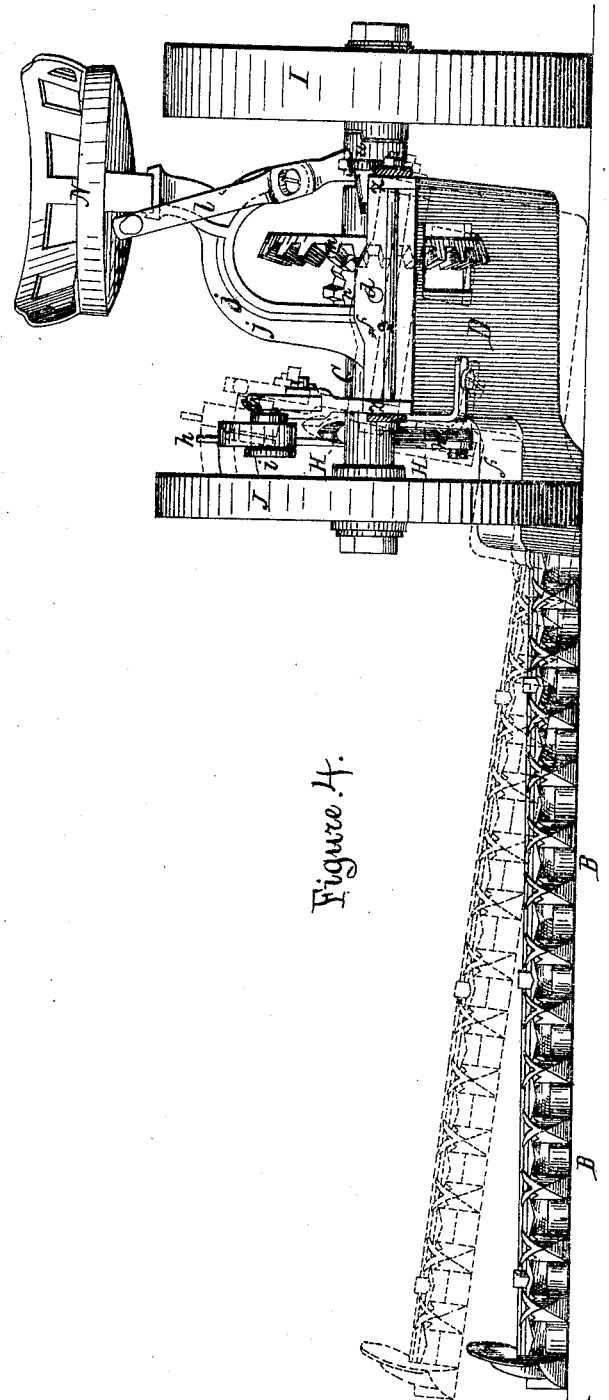

HENRY MARCELLUS, OF AMSTERDAM, NEW YORK.

IMPROVEMENT IN MOWING-MACHINES.

Specification forming part of Letters Patent No. 29,895, dated September 4, 1860.

*To all whom it may concern:*

Be it known that I, HENRY MARCELLUS, of Amsterdam, in the county of Montgomery and State of New York, have invented certain new and useful Improvements in Mowing-Machines, of which the following is a full, clear, and exact description, reference being had to the accompanying drawings, making part of this specification, in which—

Figure 1 represents a plan or top view of a mowing-machine embracing my said improvements. Fig. 2 represents an elevation of the left side of the machine. Fig. 3 represents a section taken on the line $x$ $x$ of Fig. 1, and Fig. 4 represents a front view of the machine.

That side of the machine to which the horses are attached I call the "left side," and the opposite side I call the "right side" of the machine.

The improvements which are the subject of this patent relate to mowing-machines in which the main frame, with the finger-beam attached to it, is hung from the axle of two main supporting-wheels in such a manner that it is free to vibrate up and down in planes parallel with and at right angles to the line of draft of the machine and allow the finger-beam to conform to the surface of the ground; and it consists, first, in a combination of adjustable levers, a caster-wheel, and a swinging frame carrying the finger-beam, for the purpose of raising and lowering the finger-beam evenly and holding it above the surface of the ground; second, in a machine, having a swinging frame, to which the finger-beam is attached, supporting the driver's seat on the axle of the main wheels, where it will be, to a great extent, independent of the motions of the main frame, and will not be raised or lowered or swayed laterally by the swaying back and forth and from side to side of the main frame to adapt the cutter to the surface when the machine is mowing on uneven ground.

The machine represented in the accompanying drawings is a side-draft mower, the main frame and finger-beam of which are metallic, and rigidly fastened together in a form that resembles in plan the letter L, the left end of the finger-beam being connected to the right side of the main frame, near the back of the machine. The front of the main frame is supported by two wheels, which revolve on an axle common to both, the frame being suspended from the middle of the axle by a joint that permits it to vibrate up and down and from side to side without affecting the axle or the supporting-wheels. In rear of the main frame is a caster-wheel, which has a hinge-connection with the frame and forms a fulcrum for the levers, by which the back of the frame and finger-beam are raised or lowered and held above the ground. The left main supporting-wheel is also a driving-wheel, and actuates the cutting apparatus by means of suitable gearing.

The main frame D is a thin plate of metal stiffened by a flange, $f$, around its margin, except at the rear edge, and having a suitable recess for the reception of the end of the finger-beam B. The finger-beam carries the cutting apparatus, and is fastened to the main frame by means of the recess and suitable bolts, $b$ $b$.

The pole or tongue S is connected by a hinge-joint to the front of the main frame, the bolt $s$ of said hinge passing through ears $z$ on the main frame, and through holes in the ends of the fork in which the back end of the tongue terminates.

The axle A of the wheels I and J turns in a sleeve, C, which is connected to the main frame by trunnions $c$ and $d$, working respectively in bearings in the standard $e$ and flange $f$.

On the axle A is secured a bevel master-wheel, $m$, which is constantly engaged with the gearing that transmits motion to the cutting apparatus, said gearing consisting of the bevel-pinion $n$, counter-shaft $t$, gear-wheel $o$, pinion $p$, crank-shaft $x$, and connecting-rod $y$, so that when the bevel-wheel $m$ is interlocked with the driving-wheel I by means of the sliding clutch $u$ and made to revolve with it it will impart a vibratory motion to the cutter $g$. The counter-shaft $t$ has its front bearing in the standard $e$, and its axis is therefore in the same line as that of the trunnions $c$ $d$, so that the swinging of the main frame up and down or sidewise does not disturb the engagement of the bevel-wheels $m$ and $n$. The clutch $u$ slides on the axle A, and is shifted back and forth by means of the lever $l$, which has its fulcrum on the standard $j$ of the driver's seat N, and terminates at its upper end in a handle within reach of the driver. When the driving-wheel I is interlocked with the bevel-wheel $m$, as it turns it carries with it the axle A, revolving it in the sleeve or collar C; but when it is not thus interlocked the axle is kept from revolving by the engagement of the bevel-wheel $m$ with the gearing for transmitting motion to the cutter, and the wheels I and J turn upon the axle A.

The caster-wheel E pivots in a bearing on the rear end of the curved bar G, which has a flexible connection with the main frame at the hinge-joint L, directly behind the right supporting-wheel J.

The bent lever F extends forward from and is fastened to the bar G, the connection being strengthened by the tie-rod $a$. The front end of this lever reaches forward over the main frame D, and may be raised and lowered by means of the hinged arm $q$. The latter at its lower end has a hinge-connection with the main frame, and carries on one side an adjustable roller, $i$, which moves in a slot formed on the end of the lever F by attaching to it a bar, $r$. The roller $i$ has a flange on its outer face, and turns on a bolt, $v$, which is inserted in any one of a series of holes, $w$, in the arm $q$, and is clamped wherever adjusted by a screw-nut, so that the roller turns freely on its bolt.

The lever H is connected with the main frame, immediately behind the axle A, by a rigid standard, K, Fig. 1, and at one end is linked by a strap or rod, $h$, of adjustable length, to the lever F, at about the middle of its length, while the other end projects forward and rests upon the loose collar or sleeve C as a fulcrum. When the front end of the lever F is raised by erecting the hinged arm $q$ the lever rests on the caster-wheel E as a fulcrum, and by means of the connection of the bar G with the back of the frame, and the connection of the strap $h$, through the lever H and standard K, with the front of the frame, said lever exercises a lifting action on the frame of the machine, and as the frame is held down at the point where it connects with the axle of the supporting-wheels I and J this point acts as a fulcrum, and the back of the frame and finger-beam are raised from the ground, both ends of the finger-beam being lifted simultaneously and held firmly at the requisite height.

By reversing the motion of the hinged arm $q$, permitting it to fall forward, the front end of the lever F is lowered and the back of the main frame and finger-beam again rest upon the ground.

The hinged arm $q$ is within reach of the driver of the horses when in the seat N, and can be used by him to raise the finger-beam temporarily, that it may pass over any obstruction in the path of the machine, lowering it again when the obstruction is passed, or by pulling the hinged arm back until it inclines to the rear of the machine, and the roller $i$ is at the back end of the slot in which it moves, the driver will place it in a position in which it will stand, and, holding up the front end of the lever F, keep the finger-beam raised.

The driver's seat N is supported by a bracket or standard, $j$, which is fastened to and rests upon the trunnion $d$, which projects forward from the side of the loose collar or sleeve C.

What I claim as my invention, and desire to secure by Letters Patent, is—

1. The combination of levers F and H, or their equivalents, a caster, or its equivalent, and a double-hinged main frame for the purpose of raising, lowering, and holding up both ends of the finger-beam, substantially as herein set forth.

3. In a mowing-machine whose main frame and finger-beam are rigidly connected and are free to vibrate up and down transversely to and parallel with the path of the machine, supporting the driver's seat on the axle of the driving-wheel in such manner that it will be unaffected by the lateral vibratory movements of the main frame, or the turning of the main axle, substantially as described.

In testimony whereof I have hereunto subscribed my name.

HENRY MARCELLUS.

Witnesses:
DAVID CADY,
T. J. POTTER.